US009264709B2

(12) United States Patent
Amon et al.

(10) Patent No.: US 9,264,709 B2
(45) Date of Patent: Feb. 16, 2016

(54) METHOD AND DEVICE FOR MIXING VIDEO STREAMS AT THE MACROBLOCK LEVEL

(75) Inventors: Peter Amon, München (DE); Norbert Oertel, Landshut (DE)

(73) Assignee: Unify GmbH & Co. KG, Munich (DE)

( * ) Notice: Subject to any disclaimer, the term of this patent is extended or adjusted under 35 U.S.C. 154(b) by 497 days.

(21) Appl. No.: 13/701,219

(22) PCT Filed: Jun. 14, 2011

(86) PCT No.: PCT/EP2011/002920
§ 371 (c)(1),
(2), (4) Date: May 13, 2013

(87) PCT Pub. No.: WO2011/157399
PCT Pub. Date: Dec. 22, 2011

(65) Prior Publication Data
US 2013/0223511 A1    Aug. 29, 2013

(30) Foreign Application Priority Data
Jun. 16, 2010  (DE) .......................... 10 2010 023 954

(51) Int. Cl.
H04N 7/26         (2006.01)
H04N 19/169     (2014.01)
(Continued)

(52) U.S. Cl.
CPC ........ *H04N 19/00339* (2013.01); *H04L 65/602* (2013.01); *H04L 65/605* (2013.01); *H04N 7/152* (2013.01); *H04N 19/167* (2014.11); *H04N 19/1887* (2014.11); *H04N 19/40* (2014.11); *H04N 19/61* (2014.11); *H04N 19/63* (2014.11); *H04N 19/91* (2014.11); *H04N 21/2343* (2013.01); *H04N 21/2365* (2013.01)

(58) Field of Classification Search
CPC ...................................................... H04N 7/152
USPC .................................................... 375/240.02
See application file for complete search history.

(56) References Cited

U.S. PATENT DOCUMENTS 6,535,240 B2 * 3/2003 Yang et al. ................. 348/14.08
6,891,841 B2 * 5/2005 Leatherbury et al. ......... 370/401
(Continued)

FOREIGN PATENT DOCUMENTS

TW    200850011 A    12/2008
TW    201010440 A    3/2010

OTHER PUBLICATIONS

Office Action for 102010023954.2-31 DE dated Apr. 12, 2011 (German).
(Continued)

*Primary Examiner* — William C Vaughn, Jr.
*Assistant Examiner* — Luis Perez Fuentes
(74) *Attorney, Agent, or Firm* — Buchanan Ingersoll & Rooney PC

(57) ABSTRACT

The invention relates to a method and device for mixing video streams in a video mixer device, by means of which a plurality of input video streams from different subscribers which are encoded with code words for macroblocks and in which the code words have interdependencies are combined into an output video stream. The input video streams are at least entropy-decoded to such a degree that the dependencies among the code words are dissolved, wherein the macroblocks are re-organized and mixed with each other, and the mixed macroblocks are entropy-encoded to obtain a new dedicated video stream.

20 Claims, 6 Drawing Sheets

(51) Int. Cl.

| | | |
|---|---|---|
| *H04N 7/15* | (2006.01) | |
| *H04L 29/06* | (2006.01) | |
| *H04N 19/63* | (2014.01) | |
| *H04N 19/61* | (2014.01) | |
| *H04N 19/91* | (2014.01) | |
| *H04N 19/167* | (2014.01) | |
| *H04N 19/40* | (2014.01) | |
| H04N 21/2343 | (2011.01) | |
| H04N 21/2365 | (2011.01) | |

(56) References Cited

U.S. PATENT DOCUMENTS

| | | | |
|---|---|---|---|
| 7,145,594 B2* | 12/2006 | Seo | H04N 7/152 348/14.02 |
| 7,492,387 B2* | 2/2009 | Yang et al. | 348/14.09 |
| 7,720,157 B2* | 5/2010 | Lia | H04N 7/152 375/240 |
| 8,125,932 B2* | 2/2012 | Yang | H04L 12/1813 348/14.09 |
| 8,144,854 B2* | 3/2012 | Rodman | 379/202.01 |
| 8,687,685 B2* | 4/2014 | Coban et al. | 375/240 |
| 8,805,928 B2* | 8/2014 | Potekhin et al. | 709/204 |
| 8,976,712 B2* | 3/2015 | Nir et al. | 370/261 |
| 2001/0019354 A1 | 9/2001 | Einarsson et al. | |
| 2005/0008240 A1* | 1/2005 | Banerji et al. | 382/238 |
| 2005/0231588 A1 | 10/2005 | Yang et al. | |
| 2007/0285500 A1 | 12/2007 | Ma et al. | |
| 2013/0223511 A1* | 8/2013 | Amon | H04N 7/152 375/240.02 |

OTHER PUBLICATIONS

ITU-T Recommendation H.264, Advanced Video Coding for Generic Audiovisual Services; Edition 5.0, dated Mar. 2010, p. 80.
International Search Report for PCT/EP2011/002920 dated Sep. 6, 2011 (Form PCT/ISA/210) (German Translation).
International Search Report for PCT/EP2010/002920 dated Sep. 6, 2011 (Form PCT/ISA/210) (English Translation).
Written Opinion of the International Searching Authority for PCT/EP2011/002920 dated Sep. 6, 2010 (Form PCT/ISA/237) (German Translation).
Li, et al. "A Multiple-Window Video Embedding Transcoder Based on H.264/AVC Standard" EURASIP Journal on Advances in Signal Processing, vol. 2007, Article ID 13790, 17 pgs.
Xu, et al. "Logo Insertion Transcoding for H.264/AVC Compressed Video" ICIP, 2009, pp. 3693-3696.
Shru, et al. "A DCT-Domain H.263 Based Video Combiner for Multipoint continuous Presence Video Conferencing" TEEE 1999, pp. 77-81.
Li, et al. "A Reconfigurable Video Embedding Transcoder Based on H. 264/AVC: Design Tradeoffs and Analysis" IEEE 2008, pp. 852-855.
Ren, et al., "Software Parallel CAVLC Encoder Based on stream Processing", IEEE 2009, pp. 126-133.
International Preliminary Report on Patentability and Written Opinion for PCT/EP2011/002920 dated Dec. 19, 2012 (German Translation).
International Preliminary Report on Patentability and Written Opinion for PCT/EP2010/002920 dated Dec. 19, 2012 (English Translation).

\* cited by examiner

Fig. 3

| TrailingOnes (coeff_token) | TotalCoeff (coeff_token) | 0 <= nC < 2 | 2 <= nC < 4 | 4 <= nC < 8 | 8 <= nC |
|---|---|---|---|---|---|
| 0 | 0 | 1 | 11 | 1111 | 0000 11 |
| 0 | 1 | 0001 01 | 0010 11 | 0011 11 | 0000 00 |
| 1 | 1 | 01 | 10 | 1110 | 0000 01 |
| 0 | 2 | 0000 0111 | 0001 11 | 0010 11 | 0001 00 |
| 1 | 2 | 0001 00 | 0011 1 | 0111 1 | 0001 01 |
| 2 | 2 | 001 | 011 | 1101 | 0001 10 |
| 0 | 3 | 0000 0011 1 | 0000 111 | 0010 00 | 0010 00 |
| 1 | 3 | 0000 0110 | 0010 10 | 0110 0 | 0010 01 |
| ... | ... | ... | ... | ... | ... |

METHOD AND DEVICE FOR MIXING VIDEO STREAMS AT THE MACROBLOCK LEVEL

CROSS-REFERENCE TO RELATED APPLICATIONS

This application is the United States national phase under 35 U.S.C. §371 of PCT International Application No. PCT/EP2011/002920, filed on Jun. 14, 2011 and claiming priority to German Application No. 10 2010 023 954.2, filed on Jun. 16, 2010.

BACKGROUND OF THE INVENTION

1. Field of the Invention

Embodiments relate to methods and devices for mixing video streams at the macroblock level.

2. Background of the Related Art

With certain applications, it is necessary that the contents of multiple video streams be displayed simultaneously on one device. For example, video conferences are known that include more than two participants, where the video and the audio signals are transmitted in real time between two or more locations. For this purpose, the terminals or soft clients of the users are equipped with a camera, now mostly a USB webcam, and a microphone or a headset as input devices, as well as a screen and a speaker or headset as output devices. Encoding and decoding of the video and audio signals can be hardware-based via plug-in cards or purely software-based. Today, users of a video conferencing system typically demand that not only the currently speaking participant is seen by all other participants, as is the case with "voice activated switching" systems but that all or at least several of the participants in the conversation can see each other simultaneously on the screen, as is the case with "continuous presence" systems.

An additional application example is the field of video surveillance, where several video streams from different surveillance cameras are decoded simultaneously and displayed live on a screen in the control room. If the system uses only one decoder, then only one video stream from one surveillance camera can be decoded and displayed at any given time.

Due to the fact that many installed terminals or soft clients of video conferencing systems today include only one single decoder, it is not possible to decode or display several video streams simultaneously on these terminals or soft clients. For this reason, it is a very common procedure today to use a video bridge or a multipoint control unit (MCU). This is a central unit that receives and processes the encoded video streams of several participants and returns a dedicated video stream to all participants. For this purpose, the video streams must be decoded completely or at least mostly, and the video data must be combined and then encoded into a new video stream. FIG. 4 is a schematic presentation of the complete transcoding of two H.264-coded video streams. This method is often realized as a hardware-based implementation because it is very complex, which leads to high equipment costs. Furthermore, transcoding leads to delay times through the numerous signal processing steps and to quality losses through re-encoding.

An additional known method is the mixing of video streams at slice level as described in the prior application of the same applicant entitled "Mixing of Video Streams" by the inventors Peter Amon and Andreas Hutter.

In the H.264/AVC standard, the macroblocks are organized into so-called slices with the ability to decode each slice independently from the other slices. With flexible macroblock ordering (FMO) as defined in the H.264/AVC standard, a flexible assignment of macroblocks to slice groups is possible. According to the method, this possibility is now used for mixing several video streams. Thus, a slice group can be defined for each input video stream and can be combined into a stream with two slice groups using a video mixer. Shown in FIG. 5 is a schematic presentation of two H.264-coded video streams being mixed at slice level. However, many decoders in existence today do not support slice groups, such that mixing of video streams at slice level cannot be used.

Presumably, a method is known for the video coding standard H.261 that allows for combining several images into a new image at the macroblock level. The assumption that this method is known is based on the fact that the analyst report "Will Your Next Video Bridge Be Software-Based?" by Wainhouse Research in 2003 (http://www.wainhouse.com/files/papers/wrsw-video-bridges.pdf) reports on mixing of H.261 video streams, however, without providing more details about the method. Still, the performance measurements suggest that a method as described above and shown schematically in FIG. 6 is used because this many complete transcoding procedures cannot be performed simultaneously on a computer of the stated performance level.

H.261 uses a variable length codes (VLC) method for entropy coding. With variable length codes as used in the H.261 standard, a symbol to be coded is assigned permanently to a code word using a single code word table. In this manner, no dependence is established between the symbols and thus between the macroblocks. Through simple rearranging of the macroblocks, several video streams can then be assembled into one video stream.

In order to compress the transfer data once more, for example residual errors from predictions, difference in the estimated motion vectors, etc., they are coded using so-called entropy coding. The H.264/AVC standard offers two options for entropy coding, the context-based adaptive variable length coding (CAVLC) method and the context-based adaptive binary arithmetic coding (CABAC) method. Both are based on so-called adaptive context-based entropy coding, either with a variable code length or with binary arithmetic coding, and in this manner achieve performance advantages in the coding process compared to the other standards. With CAVLC, coding of a macroblock encounters dependencies of coding decisions based on adjacent already encoded macroblocks. With CABAC, encoding of a symbol affects the selection of the code word for the subsequent symbol, such that dependencies between the code words and thus between the macroblocks are created. The method for mixing video streams at the macroblock level shown for H.261-encoded streams cannot be applied directly for mixing H.264/AVC-encoded video streams.

BRIEF SUMMARY OF THE INVENTION

We desire to provide a method for mixing video streams that are encoded with code words for macroblocks and where the code words exhibit mutual dependencies that avoid the demonstrated disadvantages when compared to the prior art.

One embodiment according to the invention is based on macroblock level mixing of video streams that have been encoded according to the H.264/AVC standard. First, the video streams received by the participants must be decoded. This is done by breaking up the dependencies between the code words through complete or partial entropy decoding. Thereafter, the macroblocks of the input video streams are rearranged and assembled into a new macroblock containing all data of the individual macroblocks. Finally, a new video stream is encoded and transmitted to all or a certain number of participants such that the participants can see each other simultaneously. This occurs because the complete or partial entropy decoding, after the mixing of the video streams is reversed again by a complete or partial entropy encoding. This method is shown schematically in FIG. 2, with two H.264-encoded video streams being mixed at the macroblock level.

BRIEF DESCRIPTION OF THE FIGURES

The Figures present in exemplary fashion one embodiment of the invention.

FIG. 3 shows the VLC table for (de-)coding of coeff_token as defined in H.264/AVC.

DETAILED DESCRIPTION OF THE INVENTION

Figure 1:
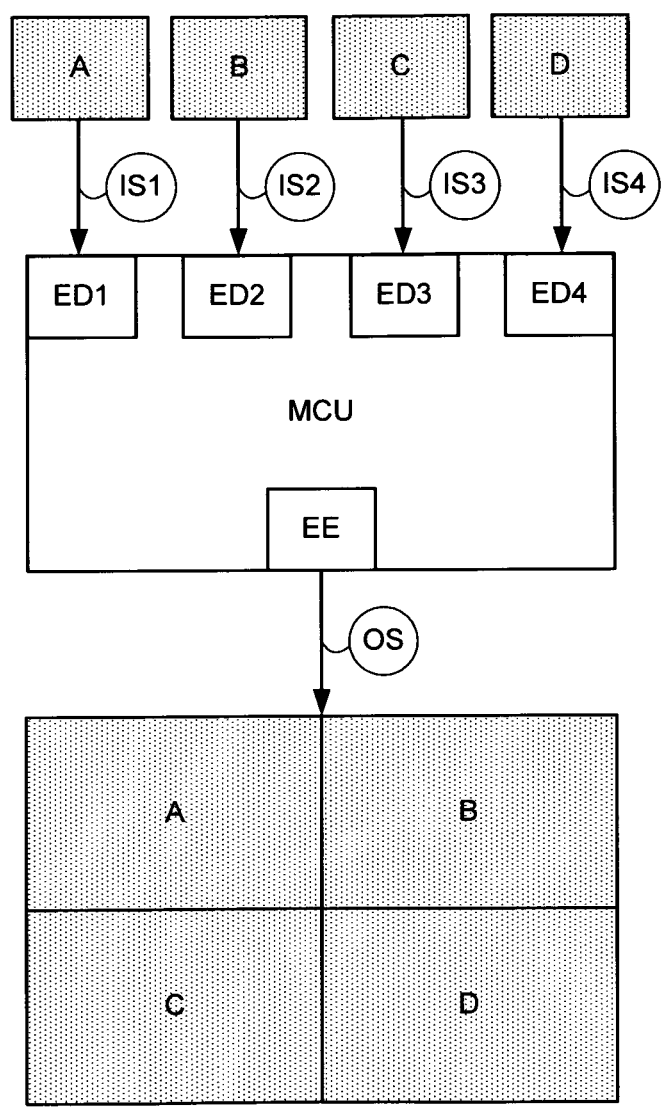
FIG. 1 shows the mixing of four input video streams using an MCU.

Embodiments of the invention can be used for both entropy coding methods CAVLC and CABAC as defined in the H.264/AVC standard.

With the CAVLC method, the elements to be encoded are switched between various VLC tables depending on the already transmitted data. A significantly increased performance is achieved, compared to the exponential Golomb code, because the VLC tables have been designed carefully based on statistics.

With the CAVLC method, the following syntax elements are encoded for each 4×4 block:
  coeff_token: Number of coefficients not equal to zero (0-16) and number of ones at the end of the zigzag scan, the so-called "trailing ones"
  trailing_ones_sign_flag: Sign of the "trailing ones"
  level_prefix and level_suffix: Magnitude and sign of the coefficients not equal to zero, without "trailing ones"
  total_zeros: Number of coefficients equal to zero in the 4×4 block up to the last coefficient not equal to zero in the scan sequence
  run_before: Number of coefficients equal to zero up to the next coefficient not equal to zero When coding the coeff_token, one of four VLC tables is selected for luminance coefficients. The selection depends on the number of coefficients not equal to zero in the two 4×4 blocks to the left and above the current 4×4 block if they are in the same slice. In H.264/AVC, a slice is a number of macroblocks that are encoded together. If the blocks do not exist, at the upper left edge of the image or at the beginning of a slice, then a default value will be set.

However, this number can change when the macroblocks are rearranged during mixing, such that the wrong table would be used for entropy decoding of the code words at the decoder. To prevent this, the respective code words have to be exchanged if a different VLC table were to result. This requires that the code words are not decoded, that is, the number of coefficients not equal to zero and the number of "trailing ones" are determined, but instead the transition can be determined directly from the table defined in the H.264/AVC standard. This VLC table is presented in FIG. 3 with the parameter nC determining the table to be selected.

The syntax element trailing_ones_sign_flag is encoded with a fixed word length and not adaptively. The syntax element level_suffix is encoded with a variable word length (0 or 1 bit). However, this word length depends only on the syntax element coeff_token for the same 4×4 block. Although the remaining syntax elements trailing_ones_sign_flag, level_prefix, level_suffix, total_zeros, run_before are adaptively encoded according to the CAVLC method, there are no dependencies outside the 4×4 block. Thus, the code words for all syntax elements except for coeff_token can be transferred directly into the mixed data stream.

Because only the macroblocks or the 4×4 blocks, respectively, at the left and upper edges need to be examined, which will no longer be located at the left or correspondingly at the upper edge after mixing, entropy decoding and the following entropy recoding can be reduced to a minimum and mixing can be carried out efficiently. For example, if two video signals are mixed on top of each other, only the macroblocks at the upper edge of the second image need to be examined and if necessary adapted in their entropy coding.

Entropy coding with the CABAC method is carried out in several steps:
1. Binarization of the symbol to be encoded similar to variable length coding (VLC). The binary symbols are referred to as "bins".
2. Selecting a context model based on the type of symbol to be encoded, e.g., motion vector or coefficient for each bit of the binarized symbol "bin" to be encoded.
3. Coding of the "bin" based on the selected context model, i.e., arithmetic coding of the bit based on the probabilities for "0" or "1". The probabilities result from the selection of the context model.
4. Updating the coding used in the context model, i.e., correcting the probabilities. For example, if a "1" is coded, a higher probability for a "1" is assumed for the next coding of a "bin" for its context model. The same applies correspondingly to the coding of a "0".
5. Repeating steps 3 and 4 until all "bins" of the symbol have been encoded. If the "bins" of a symbol are assigned to different contexts, then step 2 must be repeated as well.

Through the properties of arithmetic coding, one bit of the output stream can contain information for several "bins" or input symbols to be encoded, respectively, and the updating of the context models, a dependency of the current symbol to be encoded on the previous symbol within the same slice is established. At slice boundaries, the context models are set to an initial value. When the macroblocks of several video streams are mixed, then the contexts no longer correspond to each other after the mixing and the new video stream can no longer be decoded. To enable correct decoding, a total decoding of the CABAC symbols with subsequent re-coding becomes necessary. Through the new encoding, the updates of the context models are re-calculated. Only for the macroblocks is recoding not performed until the change of the input streams at the beginning of a slice, because the contexts of the slice boundaries are being initialized and are thus correct. Re-coding also starts after the initial change of the input video streams.

Symbols within a data stream that are encoded with VLC, for example for the macroblock type, etc., or a fixed word length, are transferred directly into the new data stream without entropy decoding and new entropy decoding and new entropy encoding because for them no dependence exists on previous macroblocks or in general on other coded symbols. In R264/AVC, so-called exponential Golomb codes are used as VLC. This is possible because the CABAC code word preceding the current code word with a fixed or variable length is terminated.

When mixing the video streams, the references for the intra and inter-prediction may need to be adapted or already secured during encoding, in addition to the adaptation of the entropy coding contexts. One option for achieving a correct intra-prediction is described in the prior application of the same applicant entitled "Accurate Intra Prediction for Macroblock-level mixing of video streams" by the inventors Peter Amon and Norbert Oertel. In H.264/AVC, motion vectors contain the information of the direction and of the magnitude of the movements, in order to recognize and calculate the movement between two images in the video stream. To avoid a wrong inter prediction, the motion vectors should not point outside the image, as described in the prior application of the same applicant entitled "Mixing of Video Streams" by the inventors Peter Amon and Andreas Hutter.

The method according to invention can be carried out in a particular advantageous manner also for video streams, where dependencies exist between the individual code words in entropy coding, such as with the H.264 bit streams, for example. In addition, H.264 bit streams are generated that can be processed also by H.264 decoders that do not support decoding of slice groups.

Embodiments may be further understood with reference to the figures. FIG. 1 shows the mixing of four input video streams using an MCU, where the video streams are coded according to the H.264/AVC standard. Four different H.264 input video streams IS1, IS2, IS3 and IS4 of four different participants in a video conference are present.

The different video contents A, B, C and D of the four different input video streams IS1, IS2, IS3 and IS4 are mixed together such that all video contents A, B, C and D are present simultaneously in the output video stream OS. As an example, the video contents A, B, C and D are arranged horizontally and vertically adjacent to each other such that the participants in the video conference can be seen simultaneously on the screen.

According to the H.264/AVC standard, the input video streams IS1, IS2, IS3 and IS4 are encoded using an entropy coding method. For this reason, the input video streams IS1, IS2, IS3 and IS4 are decoded by the respective entropy decoder ED1, ED2, ED3 and ED4 such that the macroblocks of the video streams can be arranged and mixed together anew in the multipoint control unit MCU. In the entropy encoder EE, the mixed macroblocks are encoded to a new dedicated H.264 output video stream OS according to the H.264/AVC standard. The video stream OS is then transmitted to all participants.

Figure 2:
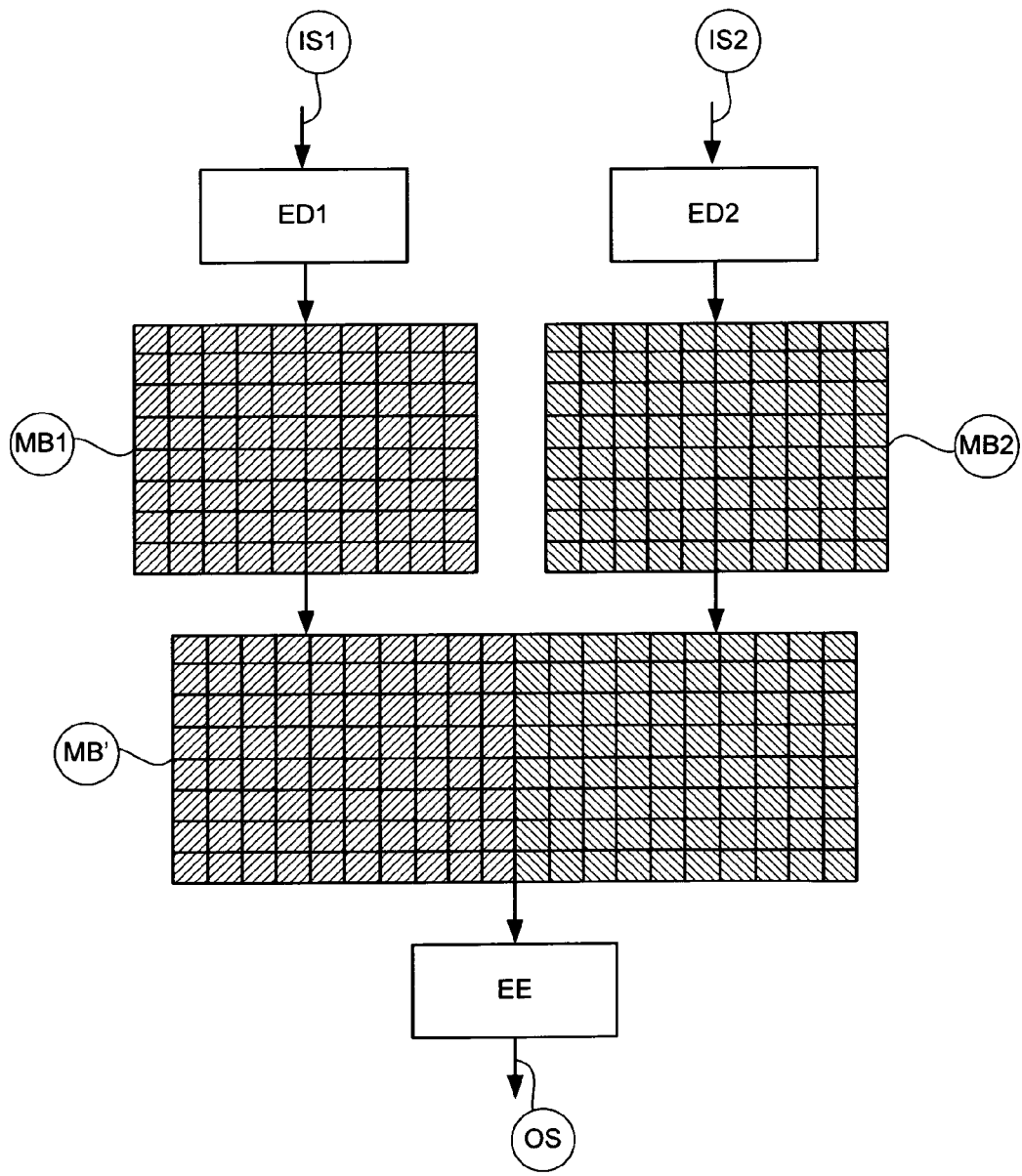
FIG. 2 shows the mixing of two H.264 video streams at the macroblock level.

FIG. 2 shows the mixing of two video streams at the macroblock level, where the video streams are encoded according to the H.264/AVC standard.

First, the video streams IS1 and IS2 received by the participants must be decoded in the respective entropy decoders ED1 and ED. This is done by breaking up the dependencies between the code words through complete or partial entropy decoding. Thereafter, the macroblocks MB1 and MB2 of the input video streams IS1 and IS2 are reorganized and assembled into a new macroblock MB' containing all data of the individual macroblocks MB1 and MB2. Finally, a new output video stream OS is encoded in the entropy encoder EE and transmitted to all participants such that all participants can see each other. This occurs because the complete or partial entropy decoding, after the mixing of the video streams is reversed again by a complete or partial entropy encoding.

FIG. 3 shows the VLC table for (de-)coding of coeff_token as defined in the H.264/AVC standard.

The CAVLC method offers four VLC table selection options for the coding of coeff_token. The selection is done via the nC value, which is calculated based on the number of coefficients in the block above nU and on the left side nL of the currently encoded block.

If the upper block and the left block are present, i.e., the two blocks are located in the same encoded slice, the parameter nC is calculated as follows: nC=(nU+nL)/2. If only the upper block is present, then nC=nU; if only the left block is present, then nC=nL, and if neither of the two blocks is present, then nC=0.

The parameter nC selects the respective VLC table depending on the number of coded coefficients in the adjacent blocks, i.e. context-adaptive.

Figure 4:
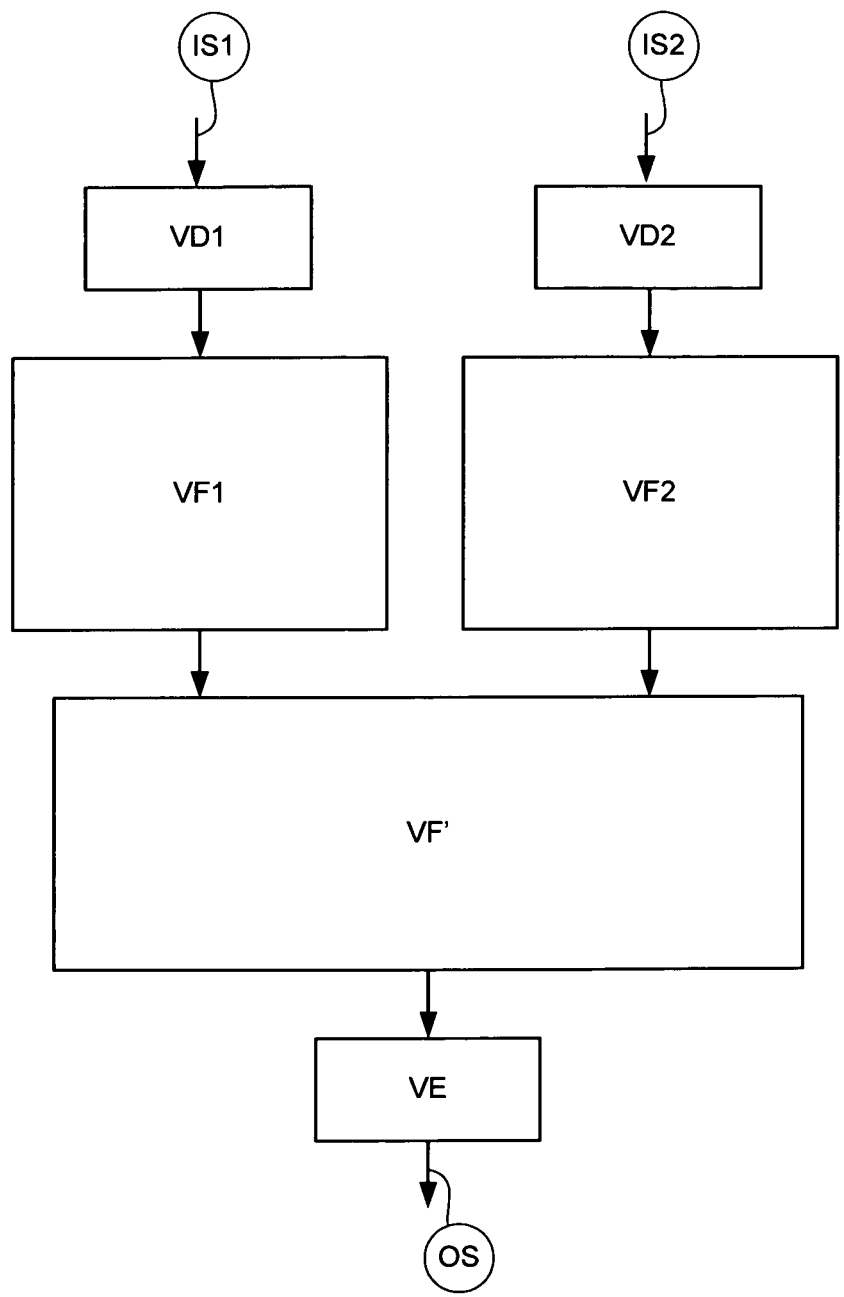
FIG. 4 shows the total transcoding of two H.264 video streams.

FIG. 4 shows the complete transcoding of video streams that are coded according to the H.264/AVC standard.

The two H.264 input video streams IS1 and IS2 of two participants are each decoded by an H.264 video decoder VD1 and VD2 at the frame level. After decoding the video streams IS1 and IS2 into the respective video frames VF1 and VF2, the two video frames VF1 and VF2 are mixed and assembled into a new video frame VP that contains all data of the individual video frames VF1 and VF2. Finally, a new H.264 output video stream OS is encoded in the H.264 video encoder VE and transmitted to all participants.

This process is also known as pixel domain mixing or complete transcoding, where, for example, a format conversion, mixing of image data and the generation of a conference image are carried out.

Figure 5:
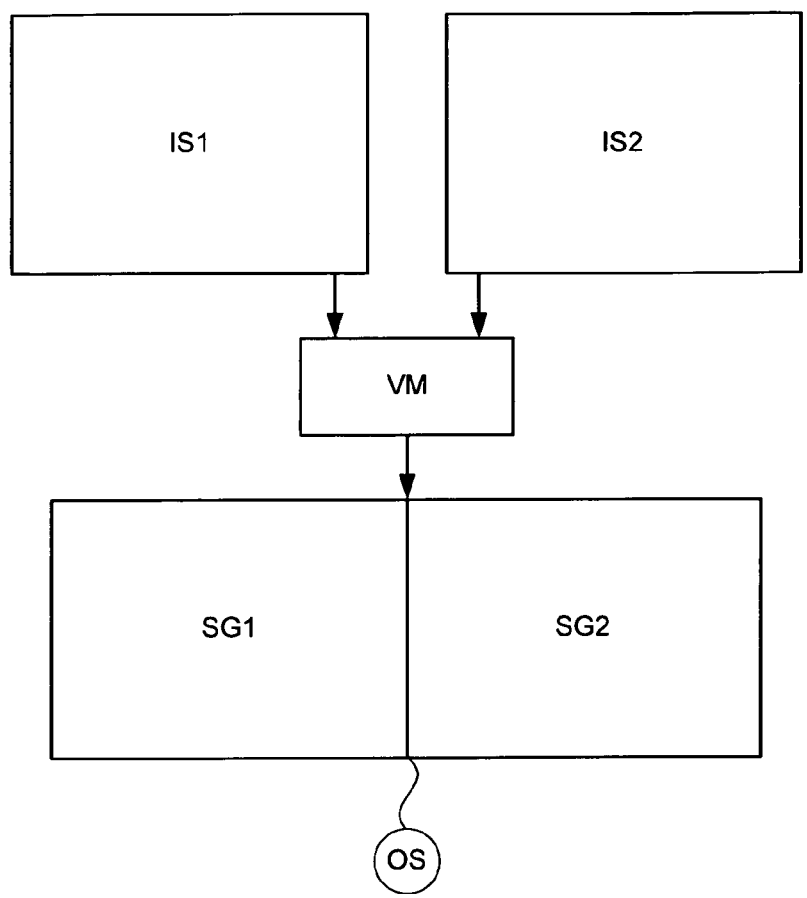
FIG. 5 shows the mixing of two H.264 video streams at the slice level.

FIG. 5 shows the mixing of two video streams at slice level, where the video streams are coded according to the H.264/AVC standard.

In the two H.264 input video streams IS1 and IS2, the macroblocks are assigned to the slices without additional aids according to the H.264 standard. Mixing of the video streams IS1 and IS2 is accomplished by flexibly assigning the macroblocks to slice groups. Thus, one slice group SG1 and SG2 is defined for each of the two video streams IS1 and IS2, and said slice groups are combined in the video mixer VM into an H.264 output video stream OS containing the data of the two slice groups SG1 and SG2.

Figure 6:
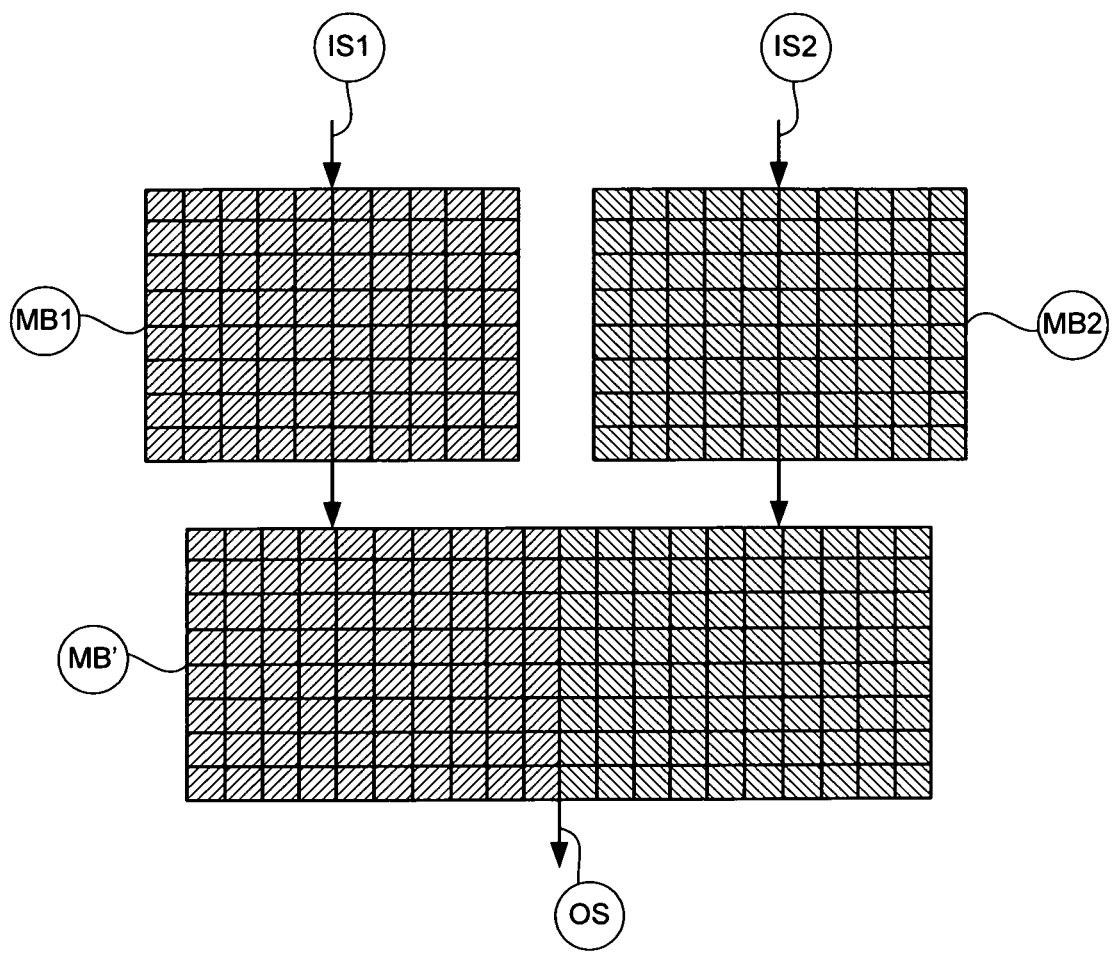
FIG. 6 shows the mixing of two H.264 video streams at the macroblock level.

FIG. 6 shows the mixing of two video streams at the macroblock level, where the video streams are encoded according to the H.261 standard.

The two H.261 input video streams IS1 and IS2 of two participants are each available as encoded macroblocks MB1 and MB2.

Mixing of the two input video streams IS1 and IS2 at the macroblock level into one encoded macroblock MB' is carried out by re-arranging the macroblocks MB1 and MB2, where said macroblock MB' contains all data of the individual macroblocks MB1 and MB2 and is transmitted as a dedicated H.261 output video stream OS to all participants.

LIST OF REFERENCE NUMBERS

A-D Video content
ED1-ED4 Entropy decoder
EE Entropy encoder
IS1-IS4 Input video streams
MB1, MB2 Encoded macroblocks
MB' Mixture of encoded macroblocks
MCU Multipoint Control Unit
OS Output video streams
SG1, SG2 Slice groups VD1, VD2 Video decoder
VE Video encoder
VF1, VF2 Video frame
VF' Mixture of video frames
VM Video Mixer

The invention claimed is:

1. A method for mixing video streams in a video mixer device comprising:
   receiving input video streams, the input video streams encoded with code words for macroblocks of the input video streams, interdependencies for the macroblocks of each input video stream being defined among the code words,
   the interdependencies affecting at least one of decoding of the macroblocks and mixing of the macroblocks for that input video stream,
   the input video streams comprising a first input video stream and a second input video stream, the first input video stream having a first macroblock and the second input video stream having a second macroblock;
   entropy decoding the input video streams such that the interdependencies among the code words are dissolved, the entropy decoding comprising:
      dissolving interdependencies among code words of the first macroblock to remove dependencies between the first macroblock and other macroblocks of the first input video stream, and
      dissolving interdependencies among code words of the second macroblock to remove dependencies between the second macroblock and other macroblocks of the second input video stream;
   intermixing the entropy decoded macroblocks of the input video streams such that data of the macroblocks of the input video streams are rearranged and mixed together;
   entropy encoding the intermixed macroblocks to form a single output video stream, the output video stream having a macroblock that comprises data from the first and second macroblocks of the first and second input video streams.

2. The method of claim 1, wherein the input video streams and the output video stream are encoded according to a H.264/AVC standard.

3. The method of claim 2, wherein motion vectors included with the macroblocks according to the H.264/AVC standard do not point outside the image to avoid a wrong inter-prediction.

4. The method of claim 2, wherein no slice groups are taken into account for entropy decoding of H.264/AVC standard video streams.

5. The method of claim 1, comprising entropy encoding the mixed macroblocks through a Context-based Adaptive Variable Length Coding (CAVLC) coding method.

6. The method of claim 5, comprising determining code words for the entropy decoding of mixed macroblocks by selecting a VLC table according to H.264/AVC.

7. The method of claim 1, comprising entropy encoding the mixed macroblocks through a Context-based Adaptive Binary Arithmetic Coding (CABAC) coding method.

8. The method of claim 7, compromising completely decoding CABAC symbols for the entropy decoding of mixed macroblocks.

9. The method of claim 1, wherein the entropy encoding of the intermixed macroblocks to form the single output video stream is performed so that the macroblock of the single output video stream has all data of the first and second macroblocks.

10. The method of claim 1, wherein the input video streams also comprise a third input video stream, and a fourth input video stream, the third input video stream having a third macroblock, and the fourth input video stream having a fourth macroblock;
    wherein the entropy decoding of the input video streams such that the interdependencies among the code words are dissolved also comprises:
    dissolving interdependencies among code words of the third macroblock of the third input video stream;
    dissolving interdependencies among code words of the fourth macroblock of the fourth input video stream; and
    wherein the entropy encoding the intermixed macroblocks to form the single output video stream comprises:
      entropy encoding the entropy decoded first, second, third, and fourth macroblocks so that the macroblock of the output video stream has all data of the first, second, third, and fourth macroblocks.

11. The method of claim 1, wherein the interdependencies among the code words for the macroblocks are defined by tables.

12. The method of claim 1, wherein, for each input video stream, the interdependencies among the code words are usable for at least one of intra-prediction and inter-prediction.

13. The method of claim 1, comprising:
    transmitting the output video stream to participant endpoints, each of the participant endpoints having transmitted a respective one of the input video streams to the video mixer device.

14. The method of claim 1, wherein the output video stream is encoded such that data of each macroblock of a respective input video stream is arranged to be included in a respective segment of the macroblock of the output video stream so that images of different video conference participants defined by the macroblocks of different input video streams are displayable simultaneously on a screen horizontally and vertically adjacent to each other.

15. A video mixer unit comprising:
    a number of entropy decoders on an input side of the video mixer unit;
    an entropy encoder on an output side of the video mixer unit; and
    wherein said mixer unit is configured to:
      receive input video streams, the input video streams encoded with code words for macroblocks of the input video streams, interdependencies being defined among the code words,
    the interdependencies affecting at least one of decoding of the macroblocks and mixing of the macroblocks for that input video stream,
    the input video streams comprising
      a first input video stream and a second input video stream, the first input video stream having a first macroblock and the second input video stream having a second macroblock;
      entropy decode the input video streams such that the interdependencies among the code words are dissolved,
    the entropy decoding of the input video streams being configured such that interdependencies among code words of the first macroblock are dissolved to remove dependencies between the first macroblock and other macroblocks of the first input video stream and interdependencies among code words of the second macroblock are dissolved to remove dependencies between the second macroblock and other macroblocks of the second video input stream;

intermix the entropy decoded macroblocks of the input video streams such that data of the macroblocks of the input video streams are rearranged and mixed together; and entropy encode the intermixed entropy decoded macroblocks of the input video streams to form a single output video stream, the output video stream having a macroblock that comprises the data from the first and second macroblocks of the first and second input video streams.

16. The video mixer unit of claim 15, wherein the video mixer unit is configured to entropy encode the intermixed entropy decoded macroblocks of the input video streams to form a single output video stream such that the intermixed entropy decoded first and second macroblocks of the first and second input video streams are entropy encoded so that the macroblock of the output video stream has all data of the first and second macroblocks.

17. The video mixer unit of claim 15, wherein the input video streams also comprise a third input video stream, and a fourth input video stream, the third input video stream having a third macroblock, and the fourth input video stream having a fourth macroblock;

wherein the video mixer unit is configured to entropy decode the input video streams such that the interdependencies among the code words are dissolved such that:

interdependencies among code words of the third macroblock of the third input video stream is dissolved and interdependencies among code words of the fourth macroblock of the fourth input video stream is dissolved; and wherein the video mixer unit is configured to entropy encode the intermixed entropy decoded macroblocks of the input video streams to form a single output video stream such that:

the intermixed entropy decoded first, second, third and fourth macroblocks of the first, second, third, and fourth input video streams are entropy encoded so that the macroblock of the output video stream has all data of the first, second, third, and fourth macroblocks.

18. The video mixer unit of claim 15, wherein interdependencies among the code words for the macroblocks are defined by tables.

19. The video mixer unit of claim 15, wherein, for each input video stream, the interdependencies among the code words are usable for at least one of intra-prediction and inter-prediction.

20. The video mixer unit of claim 15, wherein the video mixer unit is configured to transmit the output video stream to participant endpoints such that images of different video conference participants defined by the macroblocks of different input video streams are displayable horizontally and vertically adjacent to each other simultaneously on screens of the participant endpoints.

* * * * *